(12) United States Patent
Ota et al.

(10) Patent No.: US 11,192,533 B2
(45) Date of Patent: Dec. 7, 2021

(54) VEHICLE DRIVE SYSTEM

(71) Applicant: Toyota Jidosha Kabushiki Kaisha, Toyota (JP)

(72) Inventors: Junya Ota, Susono (JP); Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/715,335

(22) Filed: Dec. 16, 2019

(65) Prior Publication Data

US 2020/0189538 A1   Jun. 18, 2020

(30) Foreign Application Priority Data

Dec. 17, 2018   (JP) .............................. JP2018-235712

(51) Int. Cl.
  *F16H 48/20*   (2012.01)
  *B60T 8/1761*   (2006.01)

(52) U.S. Cl.
  CPC ............ *B60T 8/1761* (2013.01); *F16H 48/20* (2013.01); *B60T 2220/03* (2013.01); *F16H 2048/205* (2013.01)

(58) Field of Classification Search
  CPC .... B60T 8/1761; B60T 2220/03; F16H 48/20; F16H 2048/205
  See application file for complete search history.

(56) References Cited

U.S. PATENT DOCUMENTS

2017/0183009 A1   6/2017  Isono et al.
2017/0241532 A1*  8/2017  Isono ..................... F16H 48/36

FOREIGN PATENT DOCUMENTS

JP            3401336 B2 *  4/2003
JP         2017-118673 A    6/2017

* cited by examiner

*Primary Examiner* — Sherry L Estremsky
(74) *Attorney, Agent, or Firm* — Dinsmore & Shohl LLP

(57) ABSTRACT

A vehicle drive system configured to achieve a required driving force of braking force without changing an orientation of a vehicle in the event of slippage of a wheel. The vehicle drive system comprises: a torque generating device; a differential mechanism that allows a relative rotation between a right wheel and a left wheel; a differential restricting device that restricts a differential rotation between the right wheel and the left wheel; and a steering mechanism that controls a turning angle of pairs of the wheels. A first controller controls the relative rotation between the right wheel and the left wheel to be smaller than a predetermined value and second controller further controls a turning angle of the wheels controlled by the steering mechanism.

2 Claims, 9 Drawing Sheets

VEHICLE DRIVE SYSTEM

CROSS REFERENCE TO RELATED APPLICATIONS

The present application claims the benefit of priority to Japanese Patent Application No. 2018-235712 filed on Dec. 17, 2018 with the Japanese Patent Office, the entire contents of which are incorporated herein by reference in its entirety.

BACKGROUND

Field of the Disclosure

Present disclosure relates to the art of a vehicle drive system for distributing torque generated by a torque generating device to right and left wheels.

Discussion of the Related Art

JP-A-2017-118673 describes a vehicular control system for distributing a torque generated by a motor or a brake actuator to right and left wheels through a differential unit. According to the teachings of JP-A-2017-118673, a braking torque generated by the motor or the brake actuator and a torque distribution ratio to the wheels are calculated based on a target deceleration governed by a depression of a brake pedal, and a target yaw rate governed by an angle of a steering wheel.

According to the teachings of JP-A-2017-118673, torque delivered to one of right and left wheels may be reduced while increasing torque delivered to other one of the wheels by changing the torque distribution ratio of the differential unit. Therefore, if one of the right and left wheels slips, such slippage of the wheel may be solved by changing the torque distribution ratio. However, if the torque distribution ratio of the differential unit is changed, braking forces are applied, unevenly to the right and left wheels, and as a result, orientation of the vehicle may be changed. In order to avoid such change in orientation of the vehicle, the braking torque generated by the motor or the brake actuator has to be reduced, and the torque distribution ratio to the right and left wheels has to be equalized. However, a required deceleration may not be achieved.

SUMMARY

Aspects of embodiments of the present disclosure have been conceived noting the foregoing technical problems, and it is therefore an object of the present disclosure to provide a vehicle drive system configured to achieve a required driving force or braking force without changing an orientation of a vehicle from an intended orientation in the event of slippage of a wheel.

The exemplary embodiment of the present disclosure relates to a vehicle drive system comprising: a torque generating device that generates a driving torque or a braking torque; a differential mechanism that is connected to a right wheel and a left wheel of any one of pairs of wheels in such a manner as to allow the right wheel and the left wheel to rotate relatively to each other, and to distribute the torque generated by the torque generating device to the right wheel and the left wheel; a differential restricting device that restricts a relative rotation between the right and the left wheel of said one of pairs of wheels; and a steering mechanism that automatically controls a turing angle of said one of pairs of wheels or other pair of wheels with respect to an operating amount of a steering device. In order to achieve the above-explained objective, according to the exemplary embodiment of the present disclosure, the vehicle drive system is provided with: a first controller that is configured to control a speed of relative rotation between the right wheel and the left wheel of said one of pairs of wheels to be smaller than a predetermined value based on predetermined incident data; and a second controller that is configured to control a turning angle of the pair of wheels controlled by the steering mechanism based on another predetermined incident data.

In a non-limiting embodiment, the first controller may be further configured to reduce the speed of relative rotation between the right wheel and the left wheel of said one of pairs of wheels to be smaller than the predetermined value, in the event of slippage of any one of the right wheel and the left wheel of said one of pairs of wheels. On the other hand, the second controller may be further configured to change the turning angle of the pair of wheels controlled by the steering mechanism with respect to the operating amount of the steering device, in such a manner as to prevent a change in an orientation of a vehicle from an intended orientation when reducing the speed of relative rotation between the right wheel and the left wheel of said one of pairs of wheels to be smaller than the predetermined value by the first controller.

In a non-limiting embodiment, the second controller may be further configured to change the turning angle of the pair of wheels controlled by the steering mechanism in such a manner as to establish a yaw rate in accordance with the operating amount of the steering device, in the event of slippage of any one of the right wheel and the left wheel of said one of pairs of wheels.

In a non-limiting embodiment, the differential mechanism may comprise: a first planetary gear unit including a first input element to which a torque is delivered froth the torque generating device, a first output element connected to the right wheel of said one of pairs of wheels, and a first reaction element; a second planetary gear unit including, a second input element to which the torque is delivered from the torque generating device, a second output element connected to the left wheel of said one of pairs of wheels, and a second reaction element; and a torque reversing mechanism that delivers the torque of the first reaction element to the second reaction element while reversing the torque. The differential restricting device may include a differential motor that increases a reaction torque of any one of the first reaction element and the second reaction element, and that reduces a reaction torque of the other one of the first reaction element and the second reaction element. The first controller may be further configured to control an output torque of the differential motor in such a manner as to reduce the speed of relative rotation between the right wheel and the left wheel of said one of pairs of wheels to be smaller than the predetermined value, in the event of slippage of any one of the right wheel and the left wheel of said one of pairs of wheels.

Thus, according to the exemplary embodiment of the present disclosure, a relative rotation between the right wheel and the left wheel of any one of pairs of wheels is allowed by the differential mechanism, and such relative rotation is restricted by the differential restricting device. A turning angle of e.g., the other one of pairs of wheels is controlled by the steering mechanism. The first controller that is configured to control the speed of relative rotation between the right wheel and the left wheel of said one of pairs of wheels to be smaller than the predetermined value based on predetermined incident data. On the other hand, the second controller that is configured to control a turning angle of the pair of wheels controlled by the steering mechanism based on another predetermined incident data. That is, according to the exemplary embodiment of the present disclosure, the speed difference between the right wheel and the left wheel of said one of pairs of wheels, and the turning angle of e.g., the pair of front wheels are controlled independently from each other. According to the exemplary embodiment of the present disclosure, therefore, slippage of the wheel may be eliminated by reducing a relative rotation between the wheels by the first controller, in addition, an undesirable change in an orientation of the vehicle from an intended orientation may also be prevented by the second controller without redwing a driving torque or braking torque, when eliminating the slippage of the wheel by the first controller.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Figure 1:
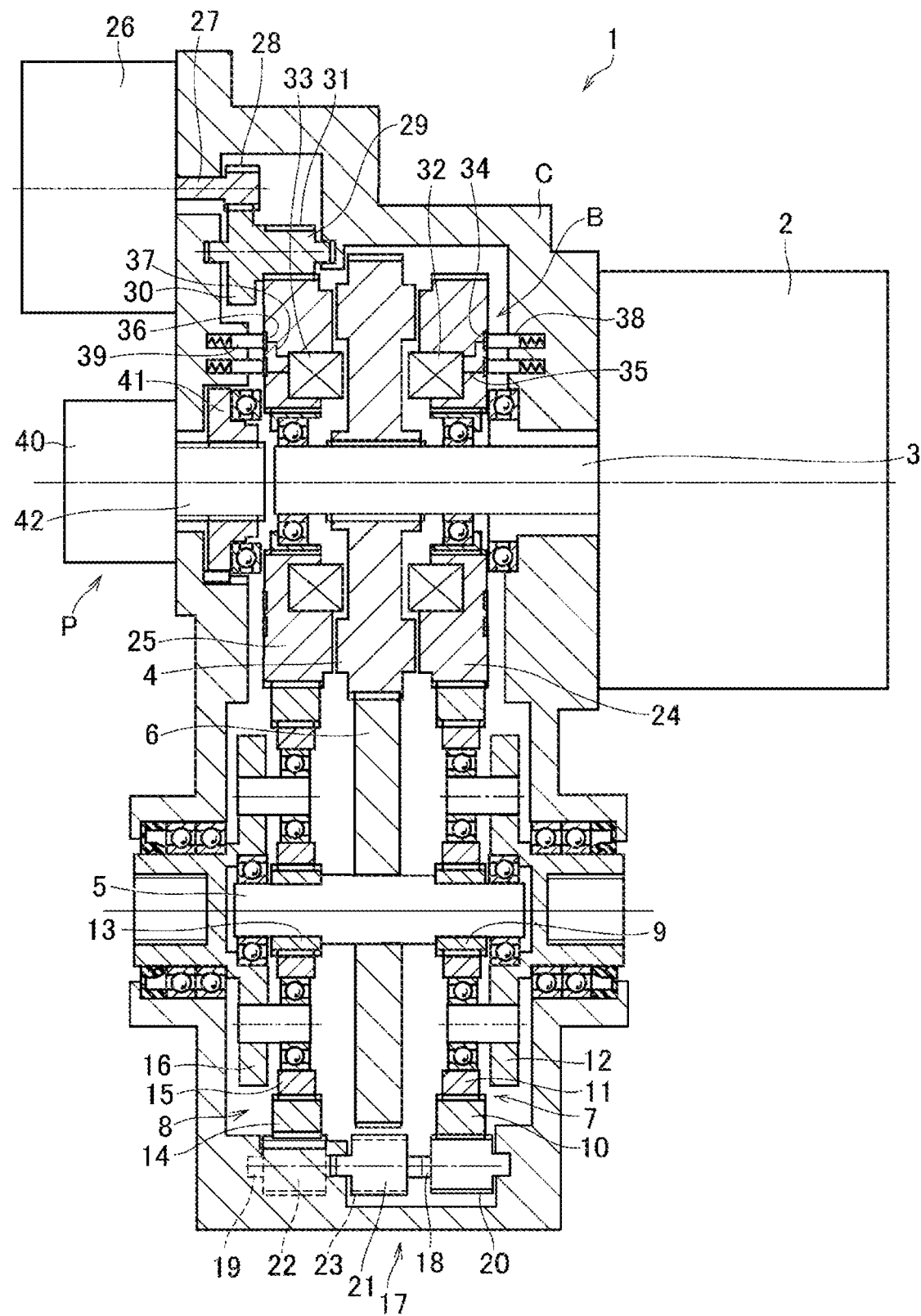
FIG. 1 is a cross-sectional view showing one example of a structure of a drive unit of a vehicle to which the drive system according to the embodiment of the present disclosure is applied.

An exemplary embodiment of the present disclosure will now be explained with reference to the accompanying drawings. Referring now to FIG. 1, there is schematically shown a structure of a drive unit 1 of a vehicle ye to which the vehicle drive system according to the embodiment of the present disclosure is applied. The drive unit 1 comprises: a torque generating device that generates a driving torque or a braking torque; a differential mechanism that distributes the torque generated by the torque generating device to a right wheel and a left wheel; and a differential restricting device that restricts a differential rotation between the right wheel and the left wheel.

As illustrated in FIG. 1, the drive unit 1 is provided with a drive motor 2 serving as a torque generating device of the embodiment of the present disclosure. For example, as a conventional hybrid vehicle and an electric vehicle, a permanent magnet synchronous motor-generator may be adopted as the drive motor 2. The drive motor 2 may serve not only as a prime mover to generate a driving torque for propelling the vehicle Ve but also as a brake to generate a braking torque for decelerating the vehicle Ve.

An output shaft 3 of the drive motor 2 extends in a width direction of the vehicle Ve, and a drive gear 4 formed of a magnetic body is flitted onto the output shaft 3. A transmission shaft 5 extends in parallel with the output shaft 3 of the drive motor 2, and a driven gear 6 is fitted onto an intermediate portion of the transmission shaft 5 while being meshed with the drive gear 4.

A first planetary gear unit 7 is connected to one end of the transmission shaft 5, and a second planetary gear unit 8 is connected to the other end of the transmission shaft 5. According to the exemplary embodiment of the present disclosure, a single-pinion planetary gear unit is adopted as the first planetary gear unit 7 and the second planetary gear unit 8 respectively.

The first planetary gear unit 7 comprises: a first sun gear 9 fitted onto the transmission shaft 5; a first ring gear 10 as an internal gear arranged concentrically with the first sun gear 9; a plurality of first planetary gears 11 interposed between the first sun gear 9 and the first ring gear 10 at predetermined intervals; and a first carrier 12 supporting the first planetary gears 11 in a rotatable manner. One of drive shafts (not shown) is joined to the first carrier 12 so that the first carrier 12 serves as an output element.

The second planetary gear unit comprises: a second sun gear 13 fitted onto the transmission shaft 5; a second ring gear 14 as an internal gear arranged concentrically with the second sun gear 13; a plurality of second planetary gears 15 interposed between the second sun gear 13 and the second ring gear 14 at predetermined intervals; and a second carrier 16 supporting the second planetary gears 15 in a rotatable manner. The other one of drive shafts (not shown) is joined to the second carrier 16 so that the second carrier 16 serves as an output element. Teeth number of the first sun gear 9 and teeth number of the second sun gear 13 are identical to each other, and teeth number of the first ring gear 10 and teeth number of the second ring gear 14 are identical to each other.

Outer teeth are formed around the first ring gear 10 and the second ring gear 14 respectively. The first ring gear 10 and the second ring gear 14 are connected to each other through a torque reversing mechanism 17 so that torque applied to one of the first ring gear 10 and the second ring gear 14 is transmitted to the other one of the first ring gear 10 and the second ring gear 14 while being reversed.

The torque reversing mechanism 17 comprises a first rotary shaft 18 and a second rotary shaft 19 individually extending parallel to the output shaft 3. A first pinion gear 20 is formed on one end of the first rotary shaft 18 to be meshed with the outer teeth of the first ring gear 10, and a second pinion gear 21 is formed on the other end of the first rotary shaft 18. Likewise, a third pinion gear 22 is formed on one end of the second rotary shaft 19 to be meshed with the outer teeth of the second ring gear 14, and a fourth pinion gear 23 is formed on the other end of the second rotary shaft 19 to be meshed with the second pinion gear 21. Here, teeth number of the first pinion gear 20 and teeth number of the third pinion gear 22 are identical to each other, and teeth number of the second pinion gear 22 and teeth number of the fourth pinion gear 23 are identical to each other. Number of the outer teeth of the first ring gear 10 and number of the outer teeth of the second ring gear 14 are also identical to each other.

A first brake gear 24 is fitted onto the output shaft 3 while being allowed to rotate relatively to the output shaft 3 and to reciprocate on the output shaft 3, and a second brake gear 25 is also fitted onto the output shaft 3 across the drive gear 4 while being allowed to rotate relatively to the output shaft 3 and to reciprocate on the output shaft 3. The first brake gear 24 is meshed with the outer teeth of first ring gear 10, and the second brake gear 25 is meshed with the outer teeth of second ring gear 14.

In order to apply torque to the second brake gear 25, the drive unit 1 is provided with a differential motor 26. An output shaft 27 of the differential motor 26 extends parallel to the output shaft 3 of the drive motor 2, and an output gear 28 is fitted onto a leading end of the output shaft 27. A countershaft 29 extends between the output shaft 27 of the differential motor 26 and the second rotary shaft 19 in parallel to those shafts, and a driven gear 30 that is diametrically larger than the output gear 28 is formed on one end of the countershaft 29 while being meshed with the output gear 28. A drive gear 31 that is diametrically smaller than the second brake gear 25 is fitted onto the other end of the countershaft 29 while being meshed with the second brake gear 25. That is, an output torque of the differential motor 26 is applied to the second brake gear 25 while being, multiplied by two gears.

In the drive unit 1, torque of the drive motor 2 is distributed to the first planetary gear unit 7 and the second planetary gear unit 8 through the transmission shaft 5, and further distributed to the right wheel and the left wheel. A torque distribution ratio to the right wheel and to the left wheel varies depending on a magnitude of a reaction torque established by the first ring gear 10, and a magnitude of a reaction torque established by the second ring gear 14. For example, when the differential motor 26 stops, same magnitude of torque is delivered from the drive motor 2 to the first ring gear 10 and the second ring gear 14. In this situation, therefore, the torque of the first ring gear 10 and the torque of the second ring gear 14 counteract against each other, and the torque is distributed to the right wheel and the left wheel equally at the ratio of 50 percent each. When the differential motor 26 generates torque thereby increasing the reaction torque of the second ring gear 14, the reaction torque of the first ring gear 10 is reduced by the torque of the differential motor 26 transmitted through the torque reversing mechanism 17. Consequently, the torque delivered to the second planetary gear unit 8 is increased larger than the torque delivered to the first planetary gear unit 7. Thus, the ratio of the torque distributed to the right wheel and the left wheel may be altered by controlling the torque of the differential motor 26.

During turning of the vehicle Ve, the right wheel and the left wheel are rotated at different speeds. In this situation, such speed difference between the right wheel and the left wheel may be absorbed by the differential motor 26. Specifically, such differential rotation between the right wheel and the left wheel may be absorbed by controlling the torque by the feedback method in, such a manner that a rotational speed of the differential motor 26 is reduced to zero. Accordingly, the differential motor 26 and the torque reversing mechanism 17 serve as a "differential rotation restricting mechanism" of the embodiment of the present disclosure.

The drive unit 1 comprises a brake mechanism B, and the braking torque generated by the brake mechanism B may be distributed to the right wheel and the left wheel. The brake mechanism B comprises a first coil 32 fitted into a depression formed on the first brake gear 24 to be opposed to the drive gear 4, and a second coil 33 fitted into a depression formed on the second brake gear 25 to be opposed to the drive gear 4. In order to supply current to the first coil 32, a lead wire 35 is arranged in the first brake gear 24 to connect the first coil 32 to an annular first terminal 34 attached to a face of the first brake gear 24 opposed to a case C. Likewise, in order to supply current to the second coil 33, a lead wire 37 is arranged in the second brake gear 25 to connect the second coil 33 to an annular second terminal 36 attached to a face of the second brake gear 25 opposed to the case C. The first terminal 34 is contacted to a first brush 38 arranged in the case C, and the second terminal 36 is contacted to a second brush 39 arranged in the ease C. Each of the first brush 38 and the second brush 39 is made of thin metal material so that the first brush 38 and the second brush 39 are deformed elastically to be contacted to the first terminal 34 and the second terminal 36 respectively when the first terminal 34 and the second terminal 36 are reciprocated in the axial direction.

In the brake mechanism B, an electromagnetic force is applied to the drive gear 4 in accordance with current supplied to the first coil 32 and the second coil 33, and the first brake gear 24 and the second brake gear 25 are brought into contact to the drive gear 4 by the electromagnetic force. As described, the first brake gear 24 and the second brake gear 25 are rotated to absorb the difference in the rotational speeds of the right wheel and the left wheel. To this end, each of the first brake gear 24 and the second brake gear 25 is rotated individually at an extremely low speed. By thus bringing the first brake gear 24 and the second brake gear 25 into contact to the drive gear 4, a braking torque is established by the drive gear 4, and the braking torque is applied to the right wheel and the left wheel.

In order to maintain a contact pressure between the second brake gear 25 and the drive gear 4 when the power is off, the drive unit 1 is provided with a parking lock mechanism P. The parking lock mechanism P comprises a parking lock motor 40 attached to the case C in an opposite side to the second brake gear 25, and an annular pushing plate 41 fitted onto an output shaft 42 of the parking lock motor 40. An outer circumference of the pushing plate 41 is splined to the case C. A thread formed on the output shaft 42 of the parking lock motor 40 is mated with a thread formed on an inner circumference of a center hole of the pushing plate 41 so that the pushing plate 41 is actuated by the parking lock motor 40 in the axial direction to push the second brake gear 25. A pressure angle between those threads is set in such a manner that the pushing plate 41 can be reciprocated in the axial direction by activating the parking lock motor 40, but torque will not act strongly in a rotational direction of the output shaft 42 when the pushing plate 41 is reciprocated. Therefore, even if a current supply to the parking lock motor 40 is stopped after pushing the second brake gear 25 onto the drive gear 4 by the pushing plate 41, the contact pressure between the second brake gear 25 and the drive gear 4 can be maintained.

Figure 2:
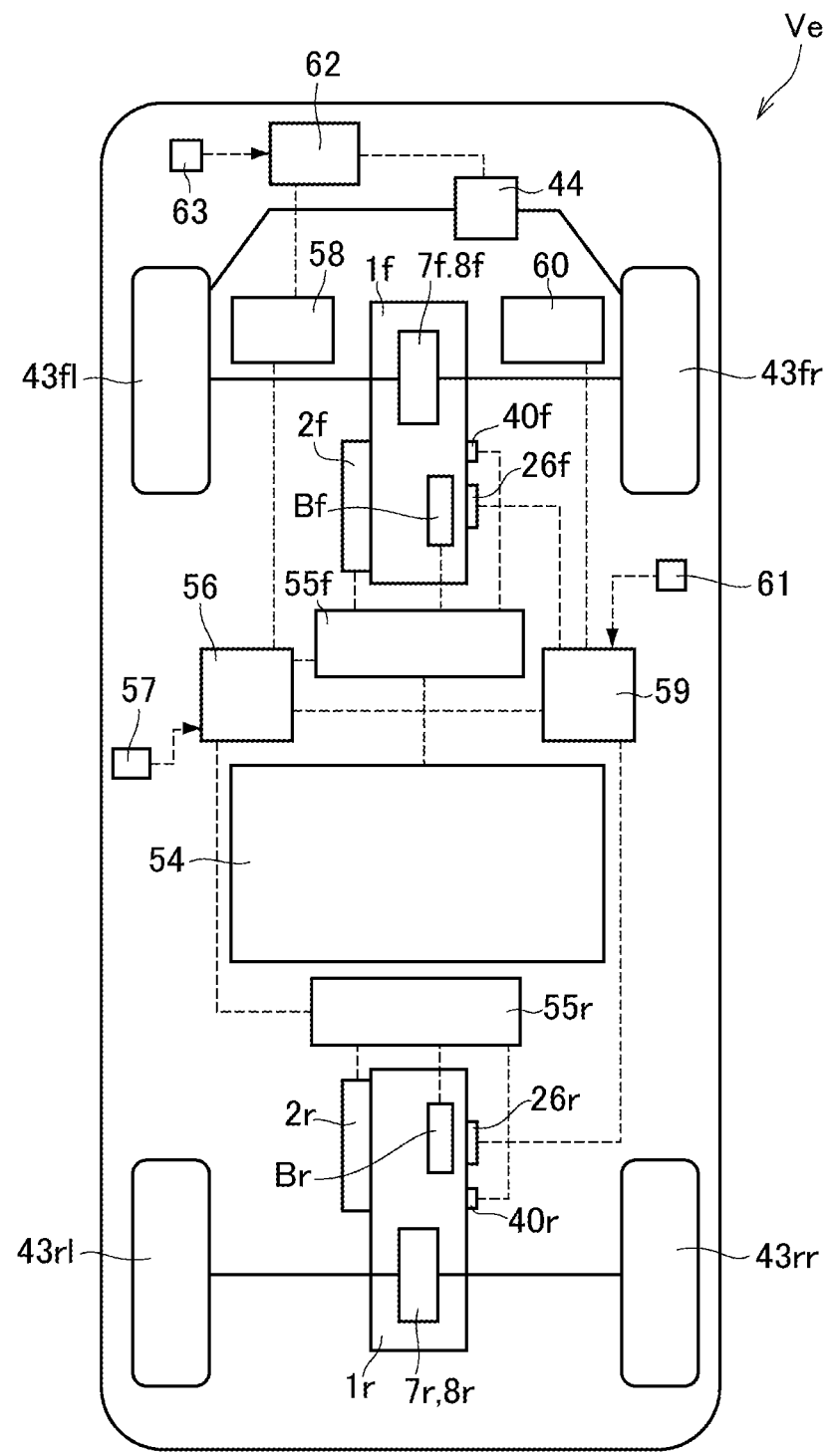
FIG. 2 is a schematic illustration showing a structure of the vehicle drive system according to the embodiment of the present disclosure.

Turning to FIG. 2, there is shown one example of a structure of a vehicle Ve in which the drive unit 1 is arranged in a front section and a rear section of the vehicle Ve respectively. In FIG. 2, electrical connections are indicated by dashed lines, and the reference letter "f" designates members arranged in the front section and the reference letter "r" designates members arranged in the rear section.

Figure 3:
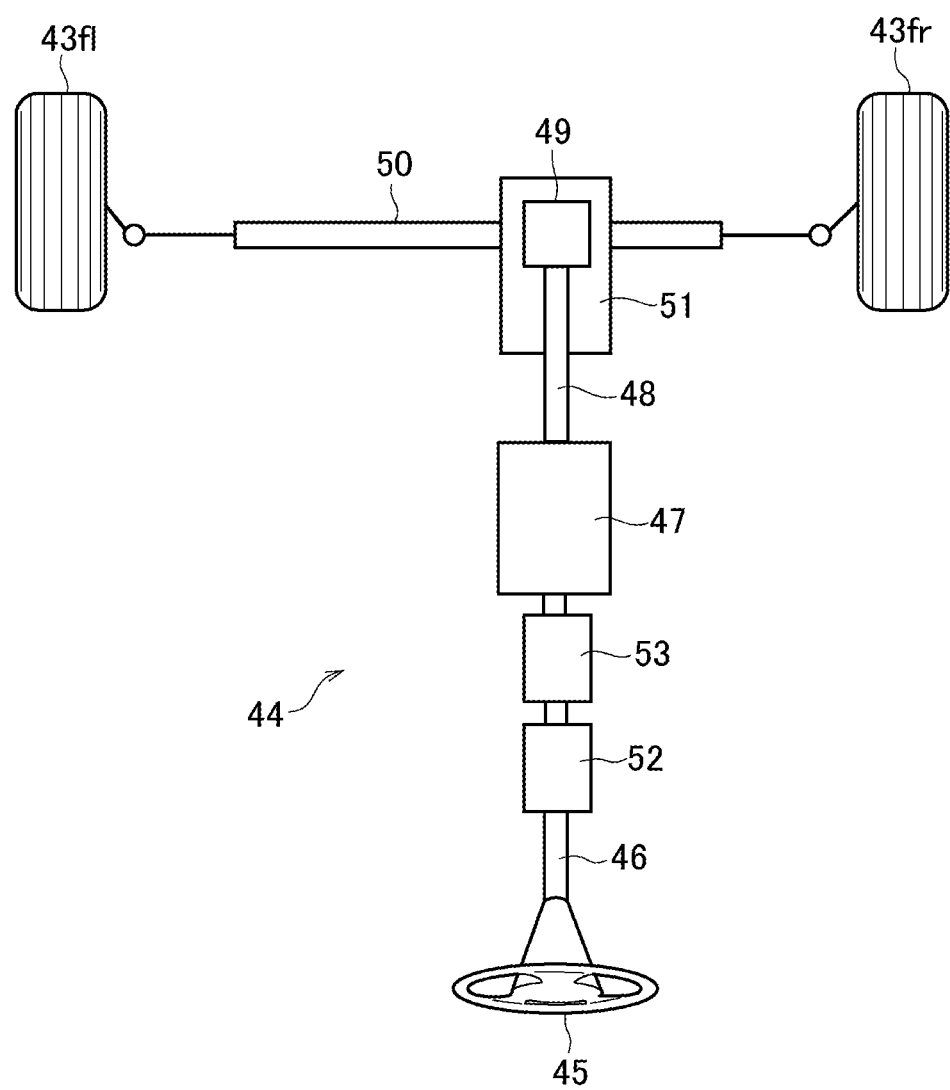
FIG. 3 is a schematic illustration showing one example of a structure of a steering mechanism of the vehicle.

In the vehicle Ve shown in FIG. 2, a steering mechanism 44 is disposed in a width center of the vehicle Ve to turn a pair of front wheels 43fr and 43fl. The steering mechanism 44 is adapted to control a turning angle of the pair of front wheels 43fl and 43fr in accordance with an operation amount (i.e., a turning angle) of an after-mentioned steering wheel 45. The steering mechanism 44 is further adapted to control a turning angle of the pair of front wheels 43fr and 43fl independently from an operation of the steering wheel 45 as necessary. A structure of the steering mechanism 44 is shown in FIG. 3 in more detail.

In the steering mechanism 44, a steering wheel 45 is attached to an upper end of an upper steering shaft 46. The upper steering shaft 46 is connected to a lower steering shaft 48 through a variable gear ratio steering (to be abbreviated as "VGRS" hereinafter) 47. The VGRS 47 comprises a carrier connected to the upper steering shaft 46 while supporting pinion gears in a rotatable manner, a sun gear connected to a VGRS motor while being meshed with the pinion gears, and a ring gear connected to the lower steering shaft 48. Therefore, a ratio of a rotational angle of the upper steering shaft 46 to a rotational angle of the lower steering shaft 48 can be varied continuously by controlling a rotational angle of the VGRS 47.

A pinion gear 49 is attached to a lower end of the lower steering shaft 48 while being meshed with a rack bar 50 in which gear teeth are formed on an outer surface. The rack bar 50 is reciprocated in the width direction of the vehicle Ve in accordance with a rotational angle of the lower steering shaft 48. A right front wheel 43fr is connected to a right end of the rack bar 50 through a right tie rod and a knuckle, and a left front wheel 43fl is connected to a left end of the rack bar 50 through a left tie rod and a knuckle.

An assist torque is applied to the lower steering shaft 48 by an electric power steering motor (to be abbreviated as the "EPS motor" hereinafter) 51. On the upper steering shaft 46, a steering angle sensor 52 is arranged to detect a turning angle of the steering wheel 45, and a steering torque sensor 53 is arranged to detect a steering torque of the steering wheel 45.

Turning back to FIG. 2, in the vehicle Ve, the front drive motor 2f, the front differential motor 26f, and the front brake mechanism Bf are electrically connected with a high-voltage power storage device 54 including a battery and a capacitor, as a conventional power storage device used in hybrid vehicles and electric vehicles. A front inverter 55f is interposed between the power storage device 54 and the motors 2f and 26f or the coils 32f and 33f. The front inverter 55f is adapted to switch current supplied to the motors 2f and 26f or the coils 32f and 33f between direct current and alternate current, and to control values and frequencies of the current.

The rear drive motor 2r, the rear differential motor 26r, and the rear brake mechanism Br are also electrically connected with the power storage device 54. A rear inverter 55r is interposed between the power storage device 54 and the motors 2r and 26r or the coils 32r and 33r. The rear inverter 55r is adapted to ch current supplied to the motors 2r and 26r or the coils 32r and 33r between direct current and alternate current, and to control values and frequencies of the current.

A first electronic control unit (to be abbreviated as the "first ECU" hereinafter) 56 as a first controller is arranged to control the front drive motor 2f, the front differential motor 25f, the front brake mechanism Bf, the rear drive motor 2r, the rear differential motor 26r, and the rear brake mechanism Br. As the conventional electronic control units, the first ECU 56 comprises a microcomputer as its main constituent.

For example, the first ECU 56 receives signals from various sensors 57 for detecting a depression of an accelerator pedal, a depression of a brake pedal, a steering angle of the steering wheel 45, a steering torque of the steering wheel 45, a speed of the vehicle Ve, speeds of each of the wheels 43, a longitudinal acceleration of the vehicle Ve, a yaw rate of the vehicle Ve, a state of charge level of the power storage device 54, a temperature of the power storage device 54 and so on. The first ECU 56 transmits control signals to the front inverter 55f, the rear inverter 55r and so on, based on the incident signals as well as formulas and maps installed in advance. In FIG. 2, only one sensor 57 is depicted for the sake of illustration.

A first auxiliary battery 58 is arranged to supply power for operating the first ECU 56 and for controlling a transistor (not shown) installed in the front inverter 55f. A voltage of the first auxiliary battery 58 is lower than a voltage of the power storage device 54.

The front parking lock mechanism Pf controls a contact pressure between the pushing plate 41f and the second brake gear 25f to serve as a backup of the front brake mechanism Bf, and the rear parking lock mechanism Pr controls a contact pressure between the pushing plate 41r and the second brake gear 25r to serve as a backup of the rear brake mechanism Br. In order to control the parking lock mechanisms Pf and Pr in the event of failure of an electric system including the first ECU 56 and the first auxiliary battery 58 or an electric system including the power storage device 54 and the inverter 55f or 55r, the vehicle drive system according to the embodiment is provided with another electronic control unit (to be abbreviated as the "backup ECU" hereinafter) 59. As the first ECU 56, the backup ECU 59 also comprises a microcomputer as its main constituent.

For example, the backup ECU 59 receives signals e.g., from a sensor 61 representing a depression of the brake pedal, current values supplied to the brake mechanisms Bf and Br, speeds of each of the wheels 43 and so on. The backup ECU 59 transmits control signals to the front parking lock mechanism Pf and the rear parking lock mechanism Pr based on the incident signals as well as formulas and maps installed in advance. The backup ECU 59 and the parking lock mechanisms Pf and Pr are activated by power supplied from a second auxiliary battery 60. In FIG. 2, only a sensor 61 is connected with the backup ECU 59 for the sake of illustration. The backup ECU 59 may receive the signals transmitted from the first ECU 56, and the backup ECU 59 may be activated in the event of failure of the first ECU 56.

In order to control the steering mechanism 44, the vehicle drive system according to the embodiment is provided with a second electronic control unit (to be abbreviated as the "second ECU" hereinafter) 62 as a second controller. Specifically, the second ECU 62 controls the EPS motor 51 and the VGRS motor 47 of the steering mechanism 44. To this end, signals representing a steering angle of the steering wheel 45, a steering torque of the steering wheel 45, a yaw rate of the vehicle Ve etc. are transmitted to the second ECU 62 from e.g., a sensor 63. The second ECU 62 transmits control signals to the EPS motor 51 and the VGRS motor 47 based on the incident signals as well, as formulas and maps installed in advance. In FIG. 2, only a sensor 63 is connected with the second ECU 62 for the sake of illustration.

Figure 4:
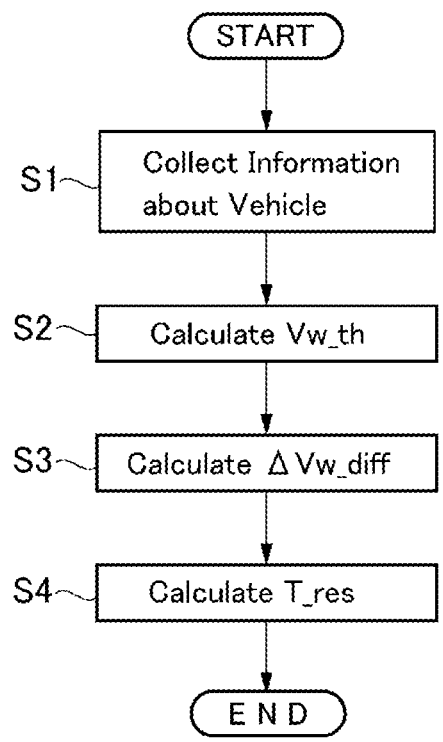
FIG. 4 is a flowchart showing one example of a routine executed by a first ECU.

FIG. 4 shows one example of a routine to control torques of the right front wheel 43fr and the left front wheel 43fl executed by the first ECU 56. Here, it is to be noted that torques of the right rear wheel 43rr and the left rear wheel 43rl may also be controlled by the procedures shown FIG. 4. At step S1, various information about the vehicle ye is collected. Specifically, at least a speed of the vehicle Ve, speeds of each of the wheels 43fr and 43fl, and a steering angle of the steering wheel 45 are obtained at step S1.

At step S2, a theoretical wheel speed Vw_th of each of the right front wheel 43fr and the left front wheel 43fl is calculated respectively, based on a speed of the vehicle Ve and a turning angle taking account of a slip ratio between a road surface and each of the right front wheel 43fr and the left front wheel 43fl.

Then, the routine progresses to step S3 to calculate a difference ΔVw_diff between: a difference ΔVw_th between theoretical speeds of the right front wheel 43fr and the left front wheel 43fl calculated at step S2 (as will be simply called the "theoretical speed difference hereinafter"); and a difference ΔVw_act between actual speeds of the right front wheel 43fr and the left front wheel 43fl (as will be simply called the "actual speed difference hereinafter").

Figure 5A:
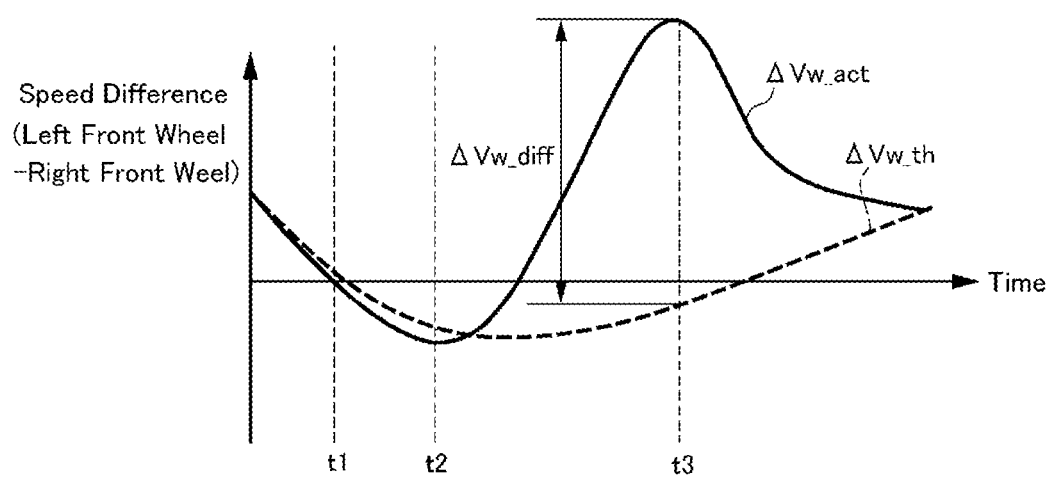
FIG. 5A is a time chart indicating temporal changes in speed difference between a right wheel and a left wheel in the event of slippage of the right wheel.
Figure 5B:
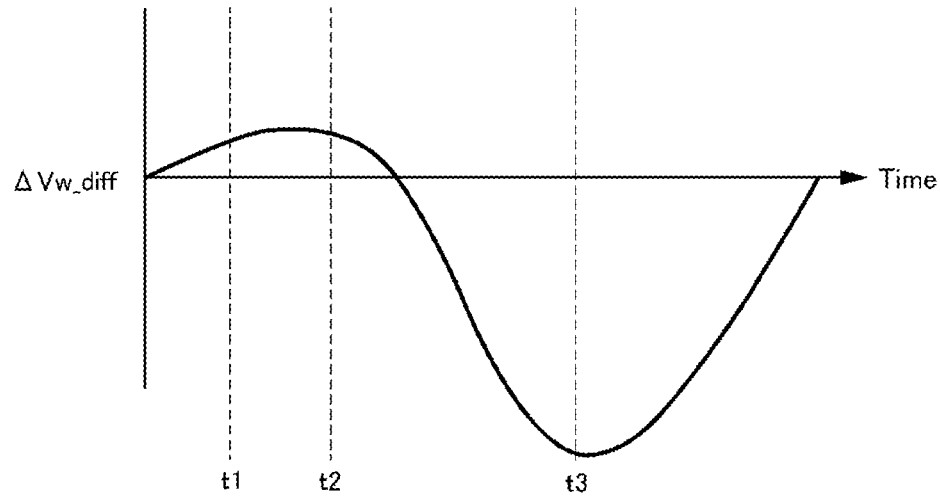
FIG. 5B is a time chart indicating temporal changes in a speed difference between the right wheel and the left wheel calculated by subtracting an actual speed different and a theoretical speed difference.

FIGS. 5A and 5B show temporal changes in the theoretical speed difference ΔVw_th, the actual speed difference ΔVw_act, and the difference ΔVw_diff between the theoretical speed difference ΔVw_th and the actual speed difference ΔVw_act, in a case of turning the steering wheel 45 to the right, then to the left, and then to the right again while decelerating the vehicle Ve.

In FIG. 5A, the vehicle axis represents a difference between speeds of the right front wheel 43fr and the left front wheel 43fl calculated by subtracting the speed of the right front wheel 43fr from the speed of the left front wheel 43fl. In the example shown in FIG. 5A, the vehicle Ve is turned to the right before point t1, and in this situation, neither of the right front wheel 43fr and the left front wheel 43fl slips. That is, slippage between the right front wheel 43fr and the road surface, and slippage between the left front wheel 43fl and the road surface falls within an allowable range respectively. In this situation, therefore, the theoretical speed difference ΔVw_th and the actual speed difference ΔVw_act are substantially identical to each other. That is, the difference ΔVw_diff between the theoretical speed difference ΔVw_th and the actual speed difference ΔVw_act is relatively small. Then, slippage of the right front wheel 43fr is caused at point t2 as a result of decelerating the vehicle Ve during turning to the left, and is locked due to such slippage. That is, a rotational speed of the right front wheel 43fr is reduced to zero at point t2. Consequently, the actual speed difference ΔVw_act is increased significantly from point t2 in a direction toward the positive value. On the other hand, the theoretical speed difference ΔVw_th stays negative in this situation. As a result, as indicated in FIG. 5B, the difference ΔVw_diff calculated by subtracting the actual speed difference ΔVw_act from the theoretical speed difference ΔVw_th changes significantly toward a negative value from point t2.

The slip of the right front wheel 43fr is eliminated gradually from point t3 so that the actual speed difference ΔVw_act is reduced. In this situation, the steering, wheel 45 is rotated to the right again so that the theoretical difference ΔVw_th is increased toward the positive value. As a result, at point t4, the difference ΔVw_diff indicated in FIG. 5B is converged to zero.

Figure 6:
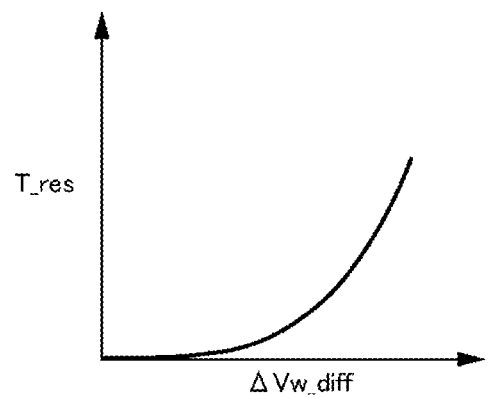
FIG. 6 is a map determining a correction amount of torque of a differential motor with respect to a difference between an actual speed difference of the wheels and a theoretical speed difference of the wheels.

Turning back to FIG. 4, at step S4, a torque T_res of the differential motor 26f to restrict a differential rotation between the right front wheel 43fr and the left front wheel 43fl is calculated based on the difference ΔVw_diff calculated at step S3. Thereafter, the routine returns. For example, the torque T_res of the differential motor 26f may be calculated sequentially based on gear ratios of the first planetary gear unit 7f and the second planetary gear unit 8f. Instead, the torque T_res of the differential motor 26f may also be determined with reference to a map shown in FIG. 6. According to the example shown in FIG. 6, the map shown in FIG. 6 is configured to increase the torque T_res of the differential motor 26f exponentially with an increase in an absolute value of the difference ΔVw_diff between the actual speed difference ΔVw_act and the theoretical difference ΔVw_th.

Figure 7:
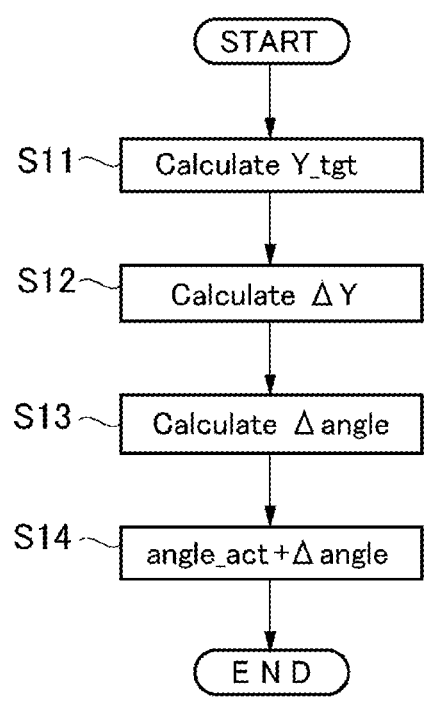
FIG. 7 is a flowchart showing an example of a routine executed by a second ECU.
Figure 8:
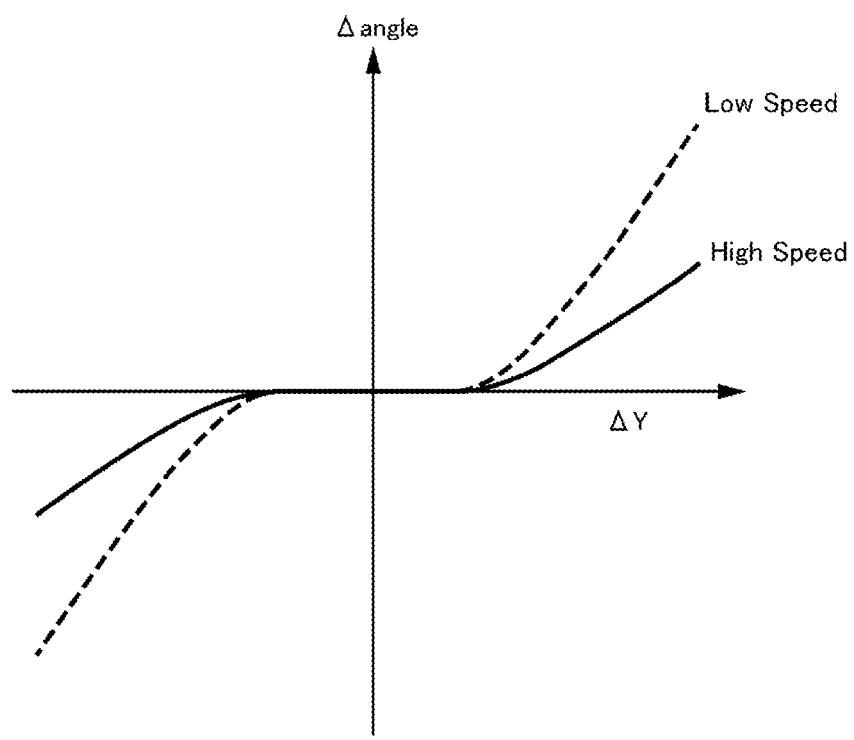
FIG. 8 is a map determining a correction amount of a steering angle based on a difference between a target yaw rate and an actual yaw rate.

Next, here will be explained a steering control executed by the second ECU 62 with referenced to FIG. 7. At step S11, a target yaw rate Y_tgt is calculated by a conventional calculation method based on a rotation for an operating amount) of the steering wheel 45 and a speed of the vehicle Ve. Then, a difference ΔY between the target yaw rate Y_tgt and an actual yaw rate Y_act is calculated at step S12, and a correction amount Δangle of a turning angle of the pair of front wheels 43fr and 43fl is calculated at step S13 based on the difference ΔY. For example, the correction amount Δangle may be calculated with reference to a map shown in FIG. 8. In the map shown in FIG. 8, the vertical axis represents the correction amount Δangle, and the horizontal axis represents the difference ΔY, the solid curve represents a relation between the difference ΔY and the correction amount Δangle at a high speed range, and the dashed curve represents a relation between the difference ΔY and the correction amount Δangle at a low speed range. As can be seen from FIG. 8, the map shown in FIG. 8 is configured to increase the correction amount Δangle with an increase in the difference ΔY, and the correction amount Δangle is further increased with a reduction in the speed of the vehicle Ve. Thereafter, the correction amount Δangle is added to a current control amount of a turning angle of the pair of front wheels 43fr and 43fl angle_act at step S14, and the routine returns.

Thus, in the event of slippage of any of the wheel 43fr, 43fl, 43rr, and 43rl, for example, in the event of slippage of the right front wheel 43fr, the first ECU 56 controls a rotational speed of the differential motor 26 in such a manner as to adjust a speed difference between the right front wheel 43fr and the left front wheel 43fl thereby achieving a target turning radius of the vehicle Ve determined based on an operating amount of the steering wheel 45. In short, a speed difference between the right front wheel 43fr and the left front wheel 43fl is adjusted by the differential motor 26 to be smaller than a predetermined value. For this purpose, specifically, torque of the differential motor 26 is controlled in such a manner as to reduce torque of the slipping wheel. For example, in a case that the slippage of one of the right wheel and the left wheel is caused due to excessive increase in driving torque, the driving torque of the slipping wheel is reduced and the driving torque of the other wheel is increased. By contrast, in a case that the slippage of one of the right wheel and the left wheel is caused due to excessive increase in braking torque, the braking torque of the slipping wheel is reduced and the braking torque of the other wheel is increased. That is, a total driving torque or a total braking torque distributed to the right wheel and the left wheel will not be changed even if the torque of the differential motor 26 is controlled as explained above. In other words, a required driving torque or braking torque may be achieved even if the torque of the differential motor 26 is controlled as explained above.

As a result of thus increasing the torque of the wheel being rotated without causing slip, a torque difference between the right wheel and the left wheel may be increased and an orientation of the vehicle Ve may be changed from an intended orientation. In order to prevent such disadvantage, according to the embodiment of the present disclosure, the second ECU 62 controls a turning angle of the pair of font wheels 43fr and 43fl independently from the first ECU 56. Specifically, the second ECU 62 is configured to calculate the correction amount Δangle of the pair of front wheels 43fr and 43fl based on the difference ΔY between the target yaw rate Y_tgt and the actual yaw rate Y_act, and to control the EPS motor 51 and the VGRS motor 47 in accordance with the correction amount Δangle.

Thus, the vehicle drive system according to the embodiment of the present disclosure is configured to control the speed difference between the right wheel and the left wheel and the turning angle of the pair of front wheels separately. Specifically, the first ECU 56 controls the speed difference between the right wheel and the left wheel based on the predetermined incident data relating e.g., to a difference between the speeds of the right wheel and the left wheel. On the other hand, the second ECU 62 controls the turning angle of the pair of front wheels based on another predetermined incident data relating e.g., to a yaw rate, which different from said predetermined data for controlling the speed difference between the right wheel and the left wheel. According to the embodiment of the present disclosure, therefore, an undesirable change in an orientation of the vehicle Ve from the intended orientation can be prevented without reducing a total torque of the right wheel and the left wheel, that is, without reducing a driving torque or braking torque, even if any of the right wheel and the left wheel slips.

Figure 9:
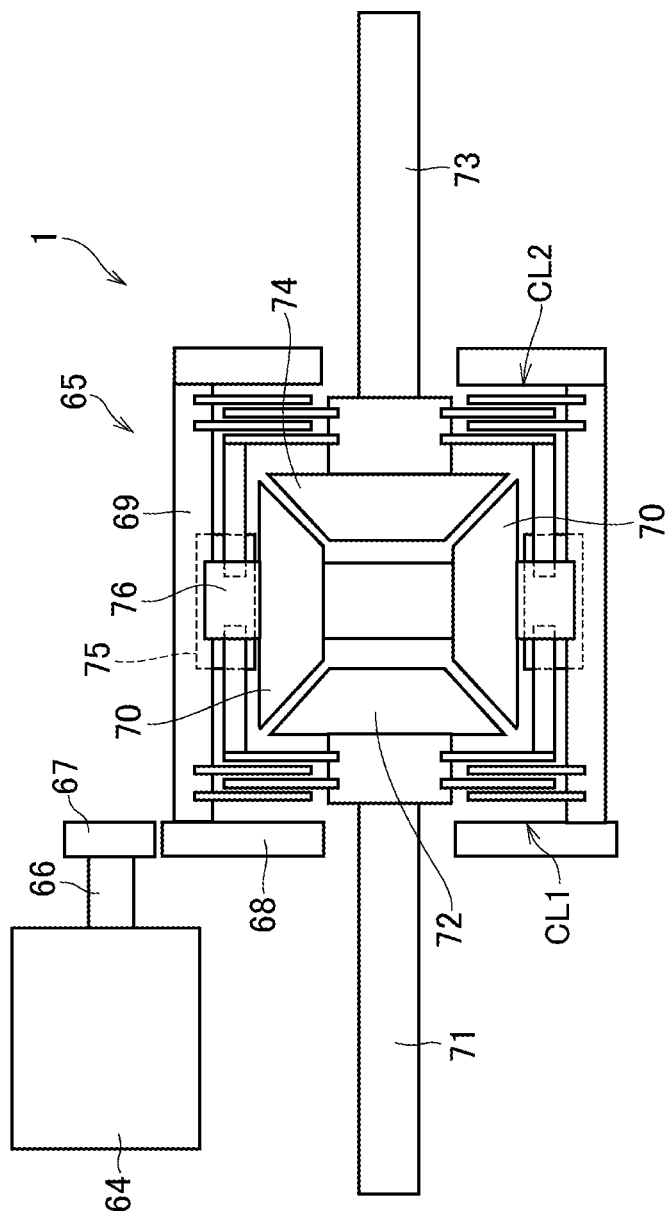
FIG. 9 is a schematic illustration showing another example of the structure of the drive unit.

Turning to FIG. 9, there is shown another example of the drive unit 1 according to the embodiment of the present disclosure. The drive unit 1 shown in FIG. 9 comprises a torque generating device 64 that generates torque to drive or brake the vehicle Ve, and a differential gear unit 65 that distributes the torque of the torque generating device 64 to the right wheel and the left wheel. For example, the above-explained drive motor 2, an electromagnetic brake, a friction brake or the like may be adopted as the torque generating device 64. The torque generated by the torque generating device 64 is outputted from an output shaft 66 on which an output gear 67 is mounted.

A structure of the differential gear unit 65 is similar to that of a conventional limit slip differential (abbreviated as LSD). Specifically, the differential gear unit 65 comprises: a housing 69 that is integrated with a ring gear 68 meshing with the output gear 67; a plurality of bevel gears 70 held in the housing 69 while keeping predetermined intervals in a rotational direction of the housing 69; a driven bevel gear 72 connected to a driveshaft 71 in a torque transmittable manner while being meshed with the bevel gears 70; another driven bevel gear 74 connected to another driveshaft 73 in a torque transmittable manner while being meshed with the bevel gears 70; a first clutch CL1 as a frictional clutch arranged in the housing 69 to change a torque transmitting capacity between the housing 69 and the driveshaft 71; and a second clutch CL2 as a frictional clutch arranged in the housing 69 to change a torque transmitting capacity between the housing 69 and another driveshaft 73. In addition, a torque generating device 75 that controls the torque transmitting capacities of the first clutch CL1 and the second clutch CL2 is attached to a shaft 76 connected to the housing 69 and the bevel gears 70.

Given that the drive unit 1 shown in FIG. 9 is applied to the vehicle Ve, a differential rotation between the right wheel and the left wheel is restricted by engaging at least any one of the first clutch CL1 and the second clutch CL2 in the event of slippage of one of the right wheel and the left wheel. According to another example therefore, the above-explained advantages of the drive unit 1 shown in FIG. 1 may also be achieved by the drive unit 1 shown in FIG. 9.

Figure 10:
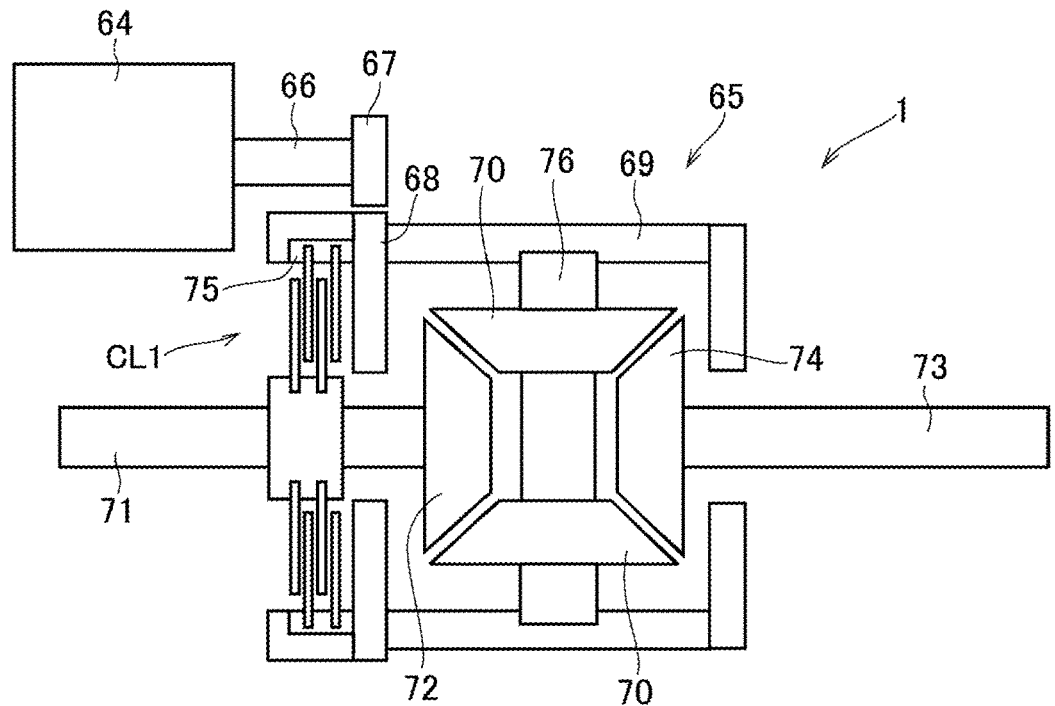
FIG. 10 is a schematic illustration showing a modification example of the structure shown in FIG. 9.

FIG. 10 shows a modification example of the drive unit 1 shown in FIG. 9. As illustrated in FIG. 10, the first clutch CL1 and the second clutch CL2 may also be arranged outside of the housing 69. Optionally, one of the first clutch CL1 and the second clutch CL2 may be omitted.

Figure 11:
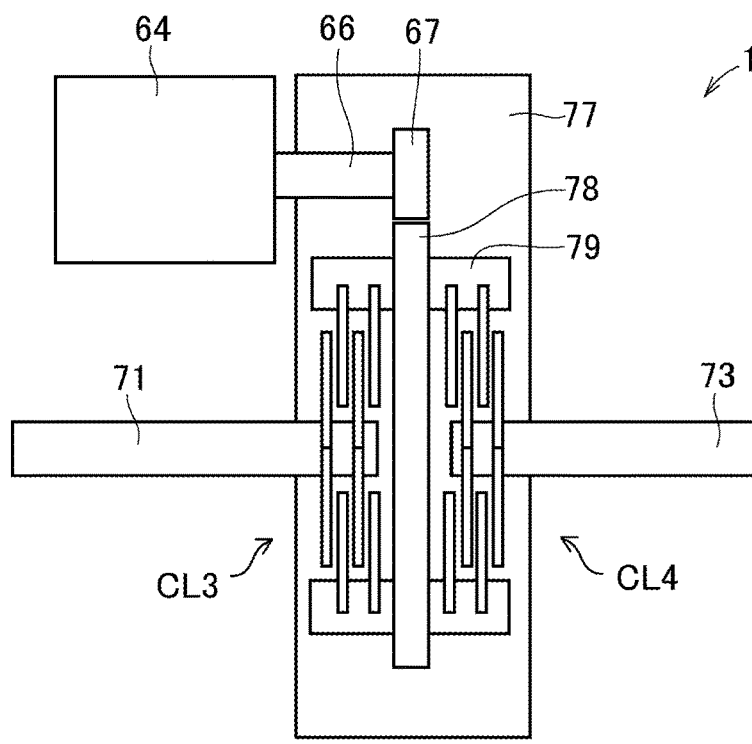
FIG. 11 is a schematic illustration showing still another example of the structure of the drive unit.

Turning to FIG. 11, there is shown still another example of the drive unit 1 according to the embodiment of the present disclosure. In the drive unit 1 shown in FIG. 11, a driven gear 78 to which torque is delivered from an output gear is arranged in a housing 77 attached to a vehicle body, and the driveshafts 71 and 73 are supported by the housing 77 while being allowed to rotate relatively to the driven gear 78. In the drive unit 1 shown in FIG. 11, a third clutch CL3, a fourth clutch CL4, and a torque generating device 79 are further arranged in the housing 77. The third clutch CL3 is a frictional clutch that changes a torque transmitting capacity between the driven gear 78 and the driveshaft 71, and the fourth clutch CL4 is also a frictional clutch that changes a torque transmitting capacity between the driven gear 78 and another drive shaft 73. Torque transmitting capacities of the third clutch CL3 and the fourth clutch CL4 are controlled by a torque generating device 79.

In the vehicle Ve to which the drive unit 1 shown in FIG. 11 is applied, a differential rotation between the right wheel and the left wheel is allowed by reducing a torque transmitting capacity of any one of the third clutch CL3 and the fourth clutch CL4. In other words, a differential rotation between the right wheel and the left wheel is restricted by engaging both of the third clutch CL3 and the fourth clutch CL4. Therefore, in the event of slippage of one of the right wheel and the left wheel, the above-explained advantages of the drive unit 1 shown in FIG. 1 may also be achieved by engaging both of the third clutch CL3 and the fourth clutch CL4.

Although the above exemplary embodiments of the present disclosure have been described, it will be understood by those skilled in the art that the present disclosure should not be limited to the described exemplary embodiments, and various changes and modifications can be made within the scope of the present disclosure. For example, the vehicle drive system according to the embodiment of the preset disclosure may also be applied to a two-wheel drive layout vehicle in which any one of pairs of the front wheels and rear wheels is driven. In a case of applying the vehicle drive system according to the embodiment of the preset disclosure to the two-wheel drive layout vehicle, the differential restricting device may be arranged to restrict a differential rotation between the rear wheels within a predetermined value, and the steering mechanism may be arranged to turn the front wheels. Further, the steering mechanism may be connected to the front wheels not only mechanically but also electrically.

What is claimed is:
1. A vehicle drive system comprising:
   a torque generating device that generates a driving torque or a braking torque;

a differential mechanism that is connected to a right wheel and a left wheel of any one of pairs of wheels in such a manner as to allow the right wheel and the left wheel to rotate relatively to each other, and to distribute the torque generated by the torque generating device to the right wheel and the left wheel;

a differential restricting device that restricts a relative rotation between the right wheel and the left wheel of said one of pairs of wheels;

a steering mechanism that automatically controls a turning angle of said one of pairs of wheels or other pair of wheels with respect to an operating amount of a steering device;

a first controller that is configured to control a speed of relative rotation between the right wheel and the left wheel of said one of pairs of wheels to be smaller than a predetermined value based on predetermined incident data; and a second controller that is configured to further control a turning angle of the pair of wheels controlled by the steering mechanism based on another predetermined incident data, wherein the first controller is further configured to reduce the speed of relative rotation between the right wheel and the left wheel of said one of pairs of wheels to be smaller than a predetermined value, in the event of slippage of any one of the right wheel and the left wheel of said one of pairs of wheels, and wherein the second controller is further configured to change the turning angle of the pair of wheels controlled by the steering mechanism with respect to the operating amount of the steering device, in such a manner as to prevent a change in an orientation of a vehicle from an intended orientation when reducing the speed of relative rotation between the right wheel and the left wheel of said one of pairs of wheels to be smaller than the predetermined value by the first controller, and wherein the second controller is further configured to change the turning angle of the pair of wheels controlled by the steering mechanism in such a manner as to establish a yaw rate in accordance with the operating amount of the steering device, in the event of slippage of any one of the right wheel and the left wheel of said one of pairs of wheels.

2. The vehicle drive system as claimed in claim 1, wherein the differential mechanism comprises:

a first planetary gear unit including a first input element to which a torque is delivered from the torque generating device, a first output element connected to the right wheel of said one of pairs of wheels, and a first reaction element;

a second planetary gear unit including a second input element to which the torque is delivered from the torque generating device, a second output element connected to the left wheel of said one of pairs of wheels, and a second reaction element; and a torque reversing mechanism that delivers the torque of the first reaction element to the second reaction element while reversing the torque, the differential restricting device includes a differential motor that increases a reaction torque of any one of the first reaction element and the second reaction element, and that reduces a reaction torque of the other one of the first reaction element and the second reaction element, and the first controller is further configured to control an output torque of the differential motor in such a manner as to reduce the speed of relative rotation between the right wheel and the left wheel of said one of pairs of wheels to be smaller than the predetermined value, in the event of slippage of any one of the right wheel and the left wheel of said one of pairs of wheels.

* * * * *